United States Patent [19]

Guscott et al.

[11] Patent Number: 4,622,540

[45] Date of Patent: Nov. 11, 1986

[54] SECURITY SYSTEM STATUS REPORTING

[75] Inventors: John K. Guscott, Lynnfield; Mario D. Casamassima, Randolph, both of Mass.

[73] Assignee: American District Telegraph Company, New York, N.Y.

[21] Appl. No.: 586,101

[22] Filed: Mar. 5, 1984

[51] Int. Cl.[4] .......................... G08B 1/00; H04Q 7/00

[52] U.S. Cl. .................................... 340/531; 340/534; 340/555; 340/506; 340/500; 340/517; 455/600; 342/435

[58] Field of Search ............... 340/531, 534, 555, 500, 340/501, 506, 511, 517; 455/600, 601, 602, 603; 343/432, 435

[56] References Cited

U.S. PATENT DOCUMENTS

| | | | |
|---|---|---|---|
| 3,665,439 | 5/1972 | Brummer et al. | 340/870.21 |
| 4,077,030 | 2/1978 | Helava | 340/870.21 |
| 4,143,368 | 3/1979 | Route et al. | 340/543 |
| 4,267,590 | 5/1981 | Bosotti | 455/600 |
| 4,460,892 | 7/1984 | Bailey, Jr. | 340/555 |

*Primary Examiner*—Donnie L. Crosland
*Attorney, Agent, or Firm*—Weingarten, Schurgin, Gagnebin & Hayes

[57] ABSTRACT

Alarm system apparatus and method for optically transmitting information indicative of system operational status from an alarm detection unit to a remote receiver. The alarm detection unit includes a light emitting element for optical transmission of diagnostic and other data to the receiver. The light emitting element is pulse activated in accordance with a specified protocol to optically transmit data serially to the receiver, and the receiver is adapted for decoding of the serially transmitted data to provide an output indication to a system user indicative of detection unit operational parameters. One embodiment of the invention includes a bar graph indicator to provide a visual indication of selected operational parameters as an aid to a user in assessing system performance characteristics.

12 Claims, 7 Drawing Figures

SECURITY SYSTEM STATUS REPORTING

FIELD OF THE INVENTION

This invention relates to security systems and more particularly to method and apparatus for optical transmission and reception of selected data indicative of security system operational characteristics.

BACKGROUND OF THE INVENTION

Alarm systems are commonly employed to provide an alarm indication in the event of an undesired intrusion or condition in a selected location. Such systems are finding increasing acceptance in military, commercial and residential applications in view of the pervasive concerns in the public and private sector relating to security and safety.

Alarm systems include event detection sensors which may be configured as stand alone units or alternatively may be clustered. Clustered systems permit monitoring of alarm data at a central station collected from numerous sensors disposed at remote locations. The occurrence of false alarms in systems including multiple sensors is at least bothersome and can even result in a breach of security or lead to life threatening situations. It is therefore advantageous to be able to ascertain proactively whether a particular sensor is fully operational and properly adjusted without extensive and time consuming evaluation. Typically, the evaluation of sensor operational characteristics requires the use of complex test equipment by technically trained personnel and is a time consuming and costly task, particularly when numerous sensors are involved. None of the security systems known in the art incorporate means for providing historical sensor operational data or means for readily displaying in a user friendly manner data representative of key sensor parameters to assure continued functional integrity of an alarm system.

SUMMARY OF THE INVENTION

In accordance with the invention, an alarm system is disclosed incorporating means for optically transmitting data indicative of system operational characteristics from an alarm detection unit to a remote receiver. The alarm detection unit includes a light emitting element such as a light emitting diode which is located on the alarm detection unit in a readily viewable location. The alarm detection unit further includes one or more registers which are adapted to retain selected system data. At selected times, the light emitting element is pulse activated in accordance with a serial bit stream protocol to optically transmit data contained in the respective registers for reception by a remote receiver.

The receiver includes an optical sensor which is operative to convert the optically transmitted data from the alarm detection unit to an electrical signal. The electrical signal is decoded by the receiver and the receiver provides an output indication to a user representative of selected transmitted data.

In one embodiment of the invention, to facilitate set-up and evaluation of an alarm detection unit, a bar graph indicator is provided. The indicator may be integral with the detection unit, appended to the detection unit or adapted for use remote from the alarm detection unit. The indicator comprises a plurality of light emitting elements or any other suitable visual indicator and is employed to provide an indication of the amplitude of the detection unit sensor output signal as a percentage of the alarm threshold. The indicator may be similarly applied for output of any other appropriate data.

DESCRIPTION OF THE DRAWINGS

The invention will be more fully understood by reference to the following detailed description in conjunction with the accompanying drawings of which.

DETAILED DESCRIPTION OF THE INVENTION

Referring generally to FIGS. 1 through 6B a security system is disclosed including means for storing selected data indicative of past and present system operational parameters and for optically transmitting the selected data from an alarm detection unit to a remote receiver to facilitate use evaluation and maintenance of the system. The detection unit in a security system includes a sensor which is operative to provide an output signal representative of a specific alarm event or condition. Such alarm events might include the detection of an intruder in a secure area, or the presence of smoke, moisture or any other specified condition. Alarm systems sensors typically produce an analog output signal and an alarm condition is identified when the sensor analog output signal exceeds a specified threshold. In accordance with the present invention, selected detection unit data is stored and optically transmitted to the receiver at selected intervals via a serial bit stream protocol. The receiver decodes the transmitted data and provides an output indication of specific detection unit data as desired by a user to permit the user to evaluate and assess the detection units key operational parameters and to permit review of selected historical operational data. User evaluation is accomplished without the need of additional test equipment and without access to the internal components of the detection unit.

Figure 1:
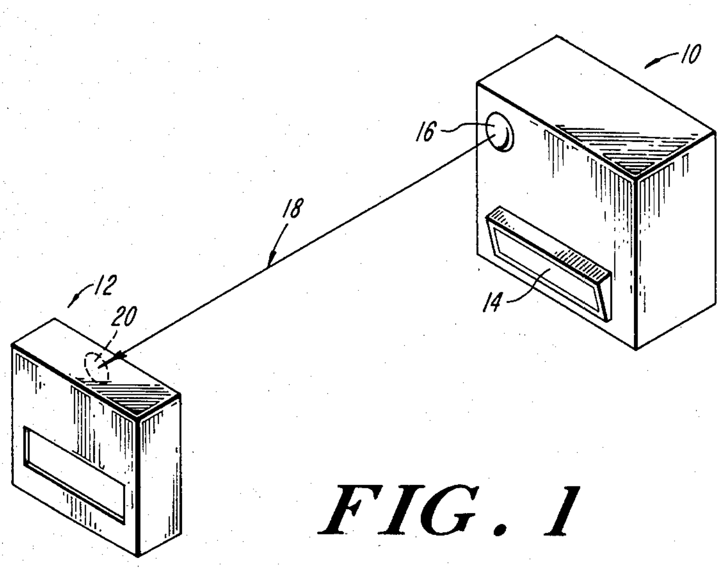
FIG. 1 is a pictorial view of an alarm detection unit and a receiver in accordance with the present invention.

Referring to FIG. 1, an alarm detection unit is shown generally designated at 10 and a receiver is shown generally designated at 12. The detection unit 10 includes a sensor 14 which may be an intrusion sensor, smoke detector, moisture detector or any other suitable sensor. The detection unit further includes a light emitting element 16 such as a light emitting diode which emits light upon electrical pulse activation of the element. The light emitting element produces a light beam modulated in accordance with a serial bit stream protocol to communicate selected data over an optical communication link 18 to the receiver 12. The receiver 12 includes a detector 20, such as a phototransistor or photodiode, which is operative to produce a detector output signal representative of the optically transmitted data.

Figure 2:
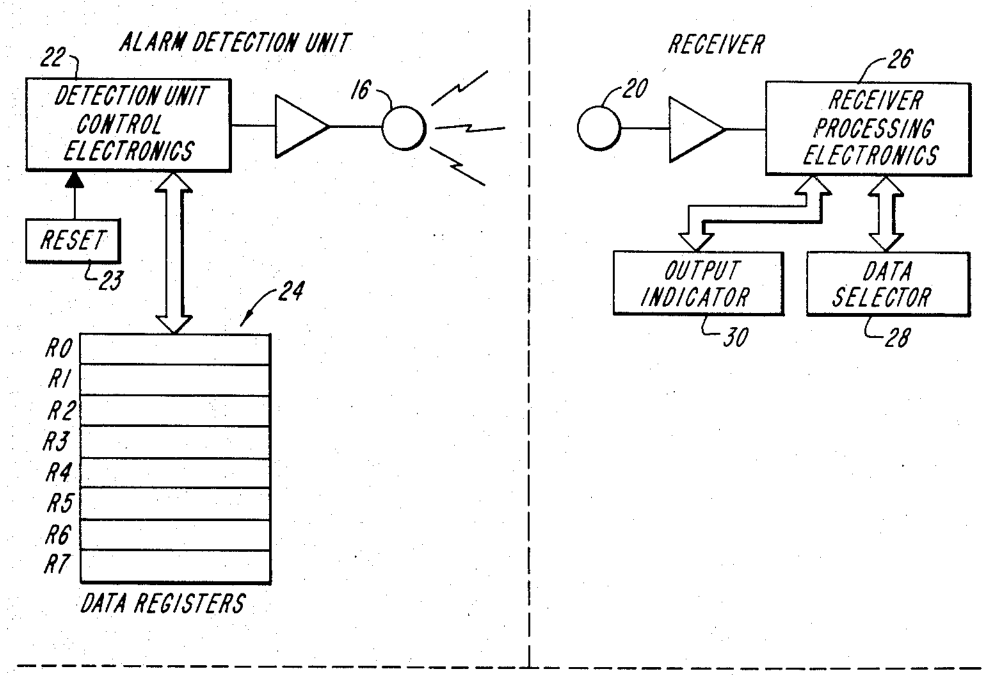
FIG. 2 is a partial block diagram of the alarm detection unit and the receiver.

Referring to the block diagram of FIG. 2 the detection unit 10 includes control circuitry 22 and a plurality of storage registers generally designated at 24. In the presently illustrated embodiment of the invention, eight (8) storage registers are provided and are identified as registers R0 through R7. It is apparent that the number of registers may be varied as desired in accord with requirements of a particular system. The registers 24 are selectively cleared upon the generation of a user activated reset signal and are adapted to digitally store selected data representative of present and historical detection unit operational characteristics. Register R0 contains data representative of the number of times the detection unit 10 sensor 14 output signal amplitude exceeds fifty (50) percent of the threshold for an alarm condition following the occurrence of a reset signal. Register R1 contains data representative of the number of times the detection unit 10 sensor 14 output signal amplitude exceeds twenty-five (25) percent but less than fifty (50) percent of the threshold for an alarm condition following the occurrence of a reset signal. Register R2 contains data representative of the peak value of the detection unit 10 sensor 16 output signal amplitude following the occurrence of a reset signal. Registers R3 and R4 contains data representative of the number of minutes and hours elapsed respectively between the occurrence of a reset signal and the peak sensor 16 output signal amplitude. Register R5 contains a digital representation of the present voltage of a detection unit 10 standby battery. Register R6 contains a digital representation of the output voltage from a temperature sensor (not shown) located in the alarm detection unit 10. Finally, Register R7 contains a digital representation of the amplitude of the detection unit 10 sensor 16 output signal. It is appreciated that the contents of the registers as well as the numbers of registers may be varied to suit different alarm system requirements.

Data is stored in the respective registers 24 at selected times under the control of the detection unit control circuitry 22. In one embodiment of the invention, the control electronics 22 includes an uPD80C48C microcomputer manufactured by Nippon Electric Corporation though any other suitable microcomputer may be substituted. This microcomputer includes resident random access memory (data memory) organized as 64 words 8-bits wide and resident read only memory or program memory organized as 1K words 8-bits wide. The registers 24 may comprise selected words of the microcomputer data memory, selected microcomputer registers, or may comprise registers external to the microcomputer.

Figure 3:
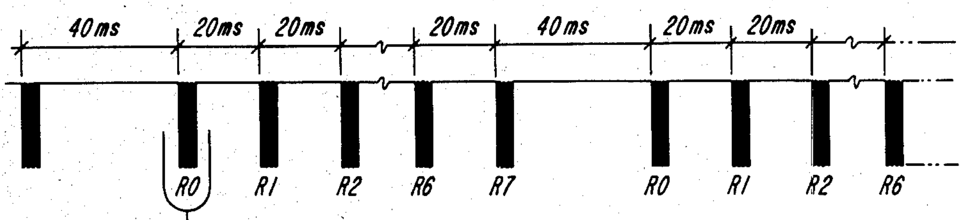
FIG. 3 is a timing diagram illustrating repetitive pulse activation of the light emitting element in accordance with the present invention.
Figure 4:
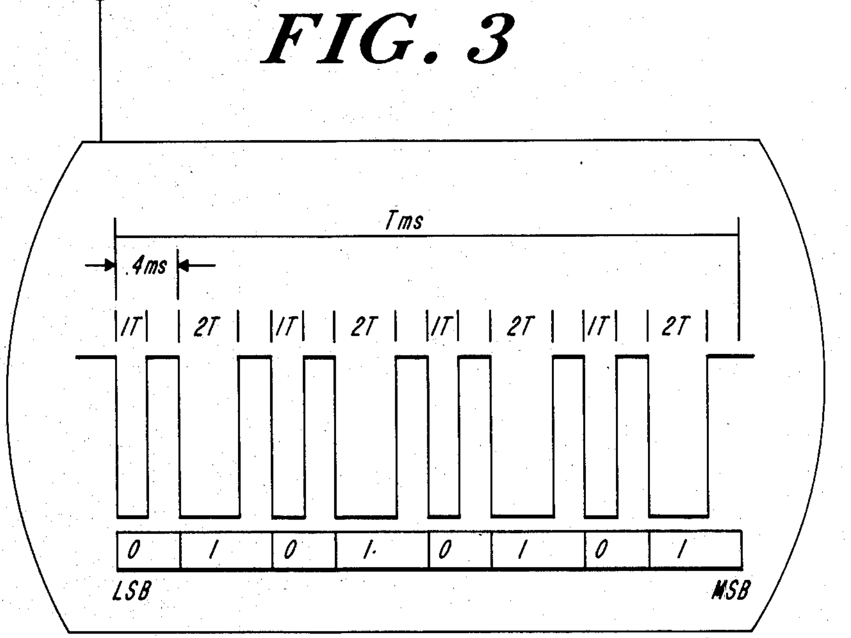
FIG. 4 is a timing diagram exemplary of a data stream in accordance with the phase encoded protocol of the present invention.

The data stored in the respective registers 24 are converted consecutively and repetitively to a serial bit stream and the register 24 data is optically transmitted in accordance with the protocol illustrated in FIGS. 3 and 4. For example, control circuitry 22 reads the data stored in the register R0. The data retrieved from the storage register R0 is in the form of binary data. As illustrated in FIG. 4 the least significant bit (LSB) of the register is a zero (0). To represent a binary zero (0), the light emitting element activating signal goes low for an interval of 0.2 milliseconds and returns to the high state for an additional 0.2 milliseconds interval under the control of circuitry 22. The next most LSB of register R0 is a one (1) and the activating signal accordingly goes low for an interval of 0.4 milliseconds and returns high for an interval of an additional 0.2 milliseconds. The remainder of the bits corresponding to the data in Register R0 are similarly converted to a bit serial signal in accordance with this protocol. The signal interval per register is therefore 3.2 milliseconds if all bits of the corresponding storage register are zero's (0's) and the interval per register is 4.8 milliseconds if all bits are one's (1's). The activating signal causes electrical energization of the light emitting element 16 to produce a light beam for transmission to and reception by the remote receiver 12. The data from the respective registers R0 through R7 is consecutively converted to an optical signal and the data transmission for each successive register is initiated 20 milliseconds after the commencement of transmission of the previous register data. It is noted that a forty (40 ) millisecond interval occurs between the end of one register group transmission and the beginning the next to permit the receiver to sync on each sequential register group transmission.

The pulse modulated light beam 18 produced by the light emitting element 16 impinges on the detector 20 of the receiver 12. The detector 20 produces a detector output signal which is applied to the receiver processing circuitry 26. In one embodiment of the invention, a data selector 28 is disposed on the receiver. The data selector 28 comprises a multi-position switch settable by a user and serves to permit the user to select display of data corresponding to one of the storage registers. Based on the data selector 28 setting, the processing circuitry 26 decodes the detector 20 output signal, stores the data and displays the data on the output indicator 30 corresponding to the data for the selected register 24. In another embodiment of the invention, the receiver processing circuitry 26 may also cause sequential display of storage register data at a rate easily viewable by a user. Alternatively, a more sophisticated output indicator may be employed to permit simultaneous display of all storage register data.

Figure 5:
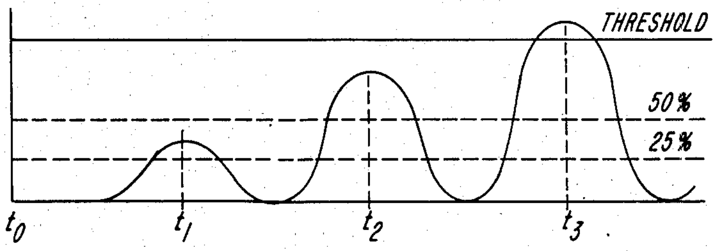
FIG. 5 is a diagram illustrating signal amplitudes representative of alarm and non-alarm events.

The application of the present invention will be further understood by reference to FIG. 5. Assume at time t0 the user manually activates a switch to reset selected storage registers 24. Thereafter at time t1 the alarm detection unit 10 sensor 14 output signal exceeds twenty-five (25) percent of the alarm threshold value. At time t1 corresponding to the sampling time of the detection unit control circuitry 22, register R1 is incremented since the value of the sensor 14 output signal exceeds twenty-five (25) percent of the threshold value and remains less than fifty (50) percent of the alarm threshold. At a second sampling time t2 the sensor 14 output signal exceeds fifty (50) percent of the alarm threshold and register R0 is accordingly incremented. At time t3, corresponding to a third sampling time, register R0 is again incremented since the detection unit 10 sensor 14 output signal exceeds 50 percent of the alarm threshold. Typically, an alarm indication would be triggered when the sensor output signal exceeds the alarm threshold. At sampling time t1 register R2 would be loaded with a value representative of the amplitude of the sensor 14 output signal, since this amplitude would represent a peak signal amplitude. Additionally, registers R3 and R4 would be loaded respectively with the elapsed minutes and hours to the peak, at time t1, from the occurrence of the previous reset pulse at time to. At sampling time t2 register R2 is loaded with a value corresponding to the amplitude of the sensor 14 output signal since the amplitude of the output signal at time t2 is greater than the amplitude of the output signal at time t1. Also at time t2, registers R3 and R4 are loaded respectively with the elapsed minutes and hours from time t0 to time t2. At time t3, the sensor 14 output signal achieves a new peak amplitude and a value representative of the peak amplitude is loaded into register R2. Registers R3 and R4 are correspondingly loaded with the elapsed time to the peak from time t0. This data in the respective registers is consecutively and repetitively transmitted via the light emitting element 16 to a remote receiver and is decoded and selectively displayed for the benefit of a user as previously discussed.

Figure 6A:
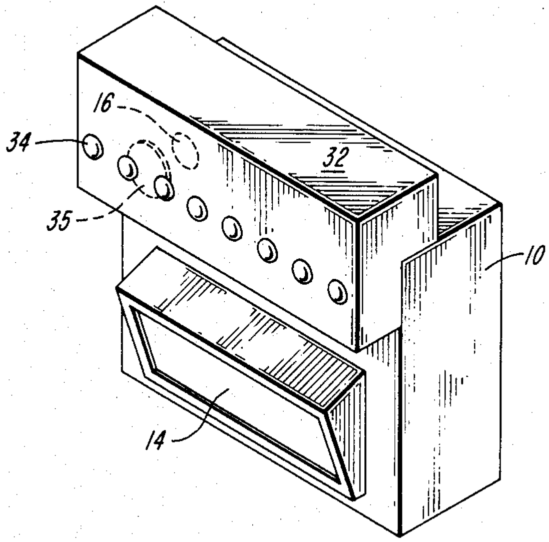
FIG. 6A is a pictorial view of one embodiment of the alarm detection unit including a bar graph indicator.

As illustrated in FIG. 6A a bar graph indicator 32 may be appended to the alarm detection unit 10 (as shown) or alternatively may be provided integral with the alarm detection unit 10. As illustrated, the bar graph indicator 32 includes a plurality of light emitting devices 34 which are selectively illuminated to indicate the amplitude of a specified signal as a percentage of a specified threshold. The indicator 32 includes a sensor 20 operative to detect light emitted by the element 16 of the alarm detection unit 10. When the alarm detection unit is employed in conjunction with the bar graph indicator 32 the element 16 is time modulated such that the element is activated for the percentage of time corresponding to the percentage of a selected analog signal with respect to a specified threshold. For example, the number of devices 34 activated may provide an approximation of the amplitude of the sensor output signal as a percentage of the alarm threshold. If the amplitude of the sensor 14 output signal is 25 percent of the alarm threshold, two of the eight light emitting elements will be activated. Similarly, if the sensor 14 output signal amplitude equals the alarm threshold all eight light emitting elements will be activated. This feature permits the sensitivity of a particular alarm detection unit 10 to be readily verified by performing walk through tests in a system adapted for intrusion monitoring. Additionally, the number of light emitting elements may be varied in accordance with the accuracy of the output indication desired. It is apparent that other signals which may be displayed as a percentage of a given threshold may be similarly monitored.

Figure 6B:
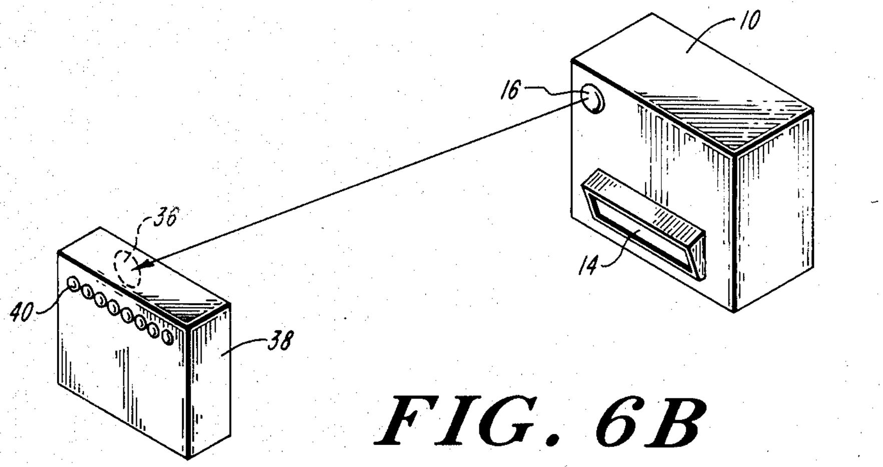
FIG. 6B is a pictorial view of another embodiment of the alarm detection unit including a remote bar graph indicator.

As illustrated in FIG. 6B, a bar graph indicator may also be disposed remote from the alarm detection unit 10. The light emitting element 16 is activated as previously described and a sensor 36 on the remote indicator 38 detects the time modulated light beam. The light emitting elements 40 on the remote indicator 38 are activated as previously set forth. The use of a remote indicator permits a user to carry the indicator in a walk through test and accurately determine the response of the alarm detection unit at various locations.

The above described invention is illustrative of method and apparatus for optically transmitting status information from an alarm detection unit to a remote receiver. Other embodiments, modifications and departures from the present disclosure are possible without departing from the inventive concepts contained herein. Consequently, the invention is to be viewed as embracing each and every novel feature and novel combination of features present in or possessed by the invention herein disclosed, and is to be limited solely by the scope and spirit of the appended claims.

We claim:

1. For use in an alarm system apparatus for optically transmitting data representative of selected alarm detection unit parameters for reception by a remote receiver comprising:

at least one register adapted to receive data representative of selected alarm detection unit status information;

means for loading each of said registers at selected times with said data;

a light emitting element disposed in a viewable location on the alarm detection unit and operative to emit light in response to electrical energization of the element;

control circuitry operative to consecutively read the data in each of said registers and to convert the data from each of said registers into an activating signal comprising a serial bit stream protocol;

means for electrically energizing said light emitting element in response to said activating signal to optically transmit data representative of said selected alarm detection unit status information for reception by the remote receiver.

2. The apparatus of claim 1 wherein said control circuitry includes a microprocessor.

3. The apparatus of claim 1 wherein said light element is a light emitting diode.

4. The apparatus of claim 1 including eight registers adapted to receive data representative of selected alarm system status information.

5. The apparatus of claim 4 including a switch operative to produce a reset signal upon user activation of said switch, said reset signal operative to cause selected ones of said registers to be preset to predetermined values.

6. The apparatus of claim 5 including a sensor operative to provide an output signal having an amplitude representative of a second condition and wherein:

one of the registers is adapted to be incremented at selected times when the amplitude of said sensor output signal exceeds a specified percentage of a predetermined threshold value;

another register is adapted to be incremented at selected times when the amplitude of the sensor output signal is less than a first specified percentage of a predetermined threshold value but greater than a second specified percentage of said predetermined threshold value;

another register is adapted to receive data at selected times representative of the peak amplitude of the sensor output signal occurring following the generation of said reset signal;

two of said registers are adapted to receive data at selected times representative of the number of hours and minutes repectively from the generation of said reset signal to said sensor output signal peak amplitude;

another register is adapted to receive data representative of the voltage of a standby battery;

another register is adapted to receive data representative of the output voltage from a temperature sensor; and another register is adapted to receive data representative of the output voltage from an alarm event sensor.

7. The apparatus of claim 1 wherein said control circuitry activating signal represents one binary state by assuming a first voltage for an interval T and a second voltage for an interval T and represents a second binary state by assuming a first voltage for an interval 2T and a second voltage for an interval T.

8. The apparatus of claim 1 wherein said light emitting element is time modulated by an activating signal and said element is repetitively activated for a percentage of time equal to the percentage of a specified alarm system signal amplitude with respect to a predetermined threshold value.

9. The apparatus of claim 8 including an annunciator operative to provide an output indication of said percentage.

10. The apparatus of claim 9 wherein said annunciator includes:

a light sensitive detector operative to provide an output signal corresponding to said activating signal;

an output indicator operative to provide an output indication representative of said percentage in response to said detector output signal;

said annunciator adapted for use at a location remote from the alarm detection unit.

11. A security system including means for optically transmitting data representative of at least one selected system parameter for remote reception and means providing an output indication of selected ones of said parameters at a remote location comprising:

an alarm detection unit including:

at least one register adapted to receive data representative of selected alarm system status information;

means for loading each of said registers at selected times with said data;

a light emitting element disposed in a viewable location on the alarm system and operative to emit light in response to electrical energization of the element;

control circuitry operative to consecutively read the data in each of said registers and to convert the data from each of said registers into an activating signal comprising a serial bit stream protocol;

means for electrically energizing said light emitting element in response to said activating signal to optically transmit data representative of said selected alarm system status information for reception by the remote receiver;

a receiver adapted to be disposed remote from the alarm detection unit and including;

a light sensitive detector operative to produce an electrical output signal comprising a serial bit stream representative of said optically transmitted data;

an output indicator;

receiver processing circuitry operative to decode said serial bit stream and operative to output selected data from said decoded serial bit stream on said output indicator for viewing by a user.

12. A method for optically transmitting alarm system status information for evaluation by a user at a remote location comprising:

locating a light emitting element on an alarm system detection unit;

storing data representative of selected alarm system operational information in at least one register at selected times;

reading said data from at least some of said registers at selected times;

converting said data into an activating signal comprising a serial bit stream;

electrically energizing said light emitting element in response to said activating signal to optically transmit data representative of said selected alarm system operational information;

detecting said optically transmitted data with a light sensitive detector disposed on a receiving unit remote from said alarm detection unit;

generating a sensor output signal in said receiving unit representative of said transmitted data;

providing an output indication on said receiving unit representative of selected data contained in said sensor output signal for evaluation by a user.

* * * * *

UNITED STATES PATENT AND TRADEMARK OFFICE

CERTIFICATE OF CORRECTION

PATENT NO. : 4,622,540

DATED : November 11, 1986

INVENTOR(S) : John Kenneth Guscott, et al

It is certified that error appears in the above-identified patent and that said Letters Patent is hereby corrected as shown below:

Column 3, line 25, "sensor 16" should read --sensor 14--.

Column 3, line 29, "sensor 16" should read --sensor 14--.

Column 3, line 36, "sensor 16" should read --sensor 14--.

Column 4, line 18, "beginning the" should read --beginning of the--.

Column 4, line 65, "to." should read t0.--

Column 5, line 20, "20 operative" should read --35 operative--.

Column 6, line 33, "second" should read --sensed--.

Column 8, line 4, "including; should read --including:--.

Signed and Sealed this

Twenty-ninth Day of March, 1988

Attest:

DONALD J. QUIGG

Attesting Officer

Commissioner of Patents and Trademarks